(12) United States Patent
Primeaux et al.

(10) Patent No.: US 11,787,490 B2
(45) Date of Patent: Oct. 17, 2023

(54) BICYCLE SADDLE

(71) Applicant: Specialized Bicycle Components, Inc., Morgan Hill, CA (US)

(72) Inventors: Philip Alan Primeaux, Capitola, CA (US); Garrett Yale Davis Getter, Morgan Hill, CA (US); Christopher Yu, Menlo Park, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 18/056,513

(22) Filed: Nov. 17, 2022

(65) Prior Publication Data

US 2023/0264772 A1 Aug. 24, 2023

Related U.S. Application Data

(63) Continuation of application No. 17/454,892, filed on Nov. 15, 2021, now Pat. No. 11,511,819, which is a continuation of application No. 16/927,765, filed on Jul. 13, 2020, now Pat. No. 11,186,336.

(60) Provisional application No. 62/877,200, filed on Jul. 22, 2019.

(51) Int. Cl.
*B62J 1/26* (2006.01)
*B62J 1/00* (2006.01)
*B62J 1/22* (2006.01)

(52) U.S. Cl.
CPC .................. *B62J 1/26* (2013.01); *B62J 1/007* (2013.01); *B62J 1/22* (2013.01); *B62J 1/002* (2013.01)

(58) Field of Classification Search
CPC ....... B62J 1/26; B62J 1/007; B62J 1/22; B62J 1/002
See application file for complete search history.

(56) References Cited

U.S. PATENT DOCUMENTS

| 574,503 A | 1/1897 | Van Meter |
| 576,310 A | 2/1897 | Henderson |
| 581,464 A | 4/1897 | Hollenbeck |

(Continued)

FOREIGN PATENT DOCUMENTS

| CN | 204341269 | 5/2015 |
| CN | 105122135 | 12/2015 |

(Continued)

OTHER PUBLICATIONS

"Carbon lattice innovation—the Adidas story", https://www.carbon3d.com/stories/carbon-lattice-innovation-the-adidas-story, Jun. 14, 2017.

(Continued)

*Primary Examiner* — Milton Nelson, Jr.
(74) *Attorney, Agent, or Firm* — KNOBBE, MARTENS, OLSON & BEAR, LLP

(57) ABSTRACT

A bicycle saddle includes: a base structure having a top portion; and a cushion coupled to the top portion of the base structure, the cushion including a first lateral side and a second lateral side separated by a longitudinal plane, wherein each of the first lateral side and the second lateral side includes: a first region having a first stiffness; a second region having a second stiffness that is less than the first stiffness; and a third region having a third stiffness that is less than the second stiffness, wherein a perimeter of the second region is at least 75% enclosed within the first region, and wherein a perimeter of the third region is at least 75% enclosed within the second region.

9 Claims, 9 Drawing Sheets

(56) References Cited

U.S. PATENT DOCUMENTS

| | | |
|---|---|---|
| 594,451 A | 11/1897 | Wheeler |
| 615,077 A | 11/1898 | Lovekin |
| 630,911 A | 8/1899 | Moore |
| 823,915 A | 6/1906 | Brooks et al. |
| D42,449 S | 4/1912 | Wittnauer |
| 2,770,287 A | 11/1956 | Christensen |
| 3,185,522 A | 5/1965 | Faulhaber |
| 3,359,718 A | 12/1967 | Nydegger |
| 3,708,201 A | 1/1973 | Lamkemeyer |
| 3,815,953 A | 6/1974 | Worley |
| 3,844,611 A | 10/1974 | Young |
| 4,098,537 A | 7/1978 | Jacobs |
| 4,218,090 A | 8/1980 | Hoffacker et al. |
| D282,219 S | 1/1986 | Persons |
| 4,572,575 A | 2/1986 | Golden et al. |
| 4,615,856 A | 10/1986 | Silverman |
| 4,662,677 A | 5/1987 | Hughes |
| 4,728,150 A | 3/1988 | Gaudreau, Jr. |
| 4,768,826 A | 9/1988 | Kashima |
| 4,850,643 A | 7/1989 | Rollman |
| 4,898,422 A | 2/1990 | West, III |
| 4,952,439 A | 8/1990 | Hanson |
| 4,993,429 A | 2/1991 | Krinsky |
| 4,998,354 A | 3/1991 | Silverman et al. |
| 5,011,222 A | 4/1991 | Yates et al. |
| 5,048,891 A | 9/1991 | Yach |
| 5,060,393 A | 10/1991 | Silverman et al. |
| 5,074,618 A | 12/1991 | Ballard |
| 5,076,642 A | 12/1991 | Beylet et al. |
| 5,108,076 A | 4/1992 | Chiarella |
| D327,655 S | 7/1992 | Ng |
| 5,165,752 A | 11/1992 | Terry |
| 5,203,607 A | 4/1993 | Landi |
| 5,286,082 A | 2/1994 | Hanson |
| 5,351,408 A | 10/1994 | Street |
| 5,356,198 A | 10/1994 | Hughes |
| 5,356,205 A | 10/1994 | Calvert et al. |
| 5,356,208 A | 10/1994 | Tadmor |
| 5,362,126 A | 11/1994 | Bontrager |
| 5,385,155 A | 1/1995 | Kittelsen et al. |
| 5,387,024 A | 2/1995 | Bigolin |
| 5,388,887 A | 2/1995 | Read |
| 5,395,155 A | 3/1995 | Yach |
| 5,442,823 A | 8/1995 | Siekman et al. |
| 5,470,590 A | 11/1995 | Brubaker et al. |
| D370,132 S | 5/1996 | Urias |
| 5,558,396 A | 9/1996 | Yu |
| 5,636,896 A | 6/1997 | Howard |
| 5,645,315 A | 7/1997 | Walker et al. |
| 5,714,108 A | 2/1998 | Girardi et al. |
| 5,720,518 A | 2/1998 | Harrison |
| D395,011 S | 6/1998 | Hanagata |
| 5,765,912 A | 6/1998 | Bontrager |
| 5,823,618 A | 10/1998 | Fox et al. |
| D400,445 S | 11/1998 | Voegeli |
| 5,863,094 A | 1/1999 | Endo |
| 5,873,626 A | 2/1999 | Katz |
| D407,910 S | 4/1999 | Terry |
| 5,904,396 A | 5/1999 | Yates |
| 5,911,474 A | 6/1999 | Lee |
| 5,911,475 A | 6/1999 | Nakahara |
| 5,918,931 A | 7/1999 | Culbertson |
| D412,791 S | 8/1999 | Tsai |
| D413,525 S | 9/1999 | Pun |
| D416,394 S | 11/1999 | Minkow et al. |
| D416,695 S | 11/1999 | Minkow et al. |
| D423,946 S | 5/2000 | Jannard et al. |
| D429,168 S | 8/2000 | Jannard et al. |
| D429,907 S | 8/2000 | Minkow et al. |
| 6,106,059 A | 8/2000 | Minkow et al. |
| D430,413 S | 9/2000 | Minkow et al. |
| D430,744 S | 9/2000 | Minkow et al. |
| D430,745 S | 9/2000 | Minkow et al. |
| 6,116,684 A | 9/2000 | Williams |
| 6,149,230 A | 11/2000 | Bontrager |
| 6,161,238 A | 12/2000 | Graebe |
| 6,244,655 B1 | 6/2001 | Minkow et al. |
| 6,254,180 B1 | 7/2001 | Nelson |
| D447,426 S | 9/2001 | Jannard et al. |
| D447,959 S | 9/2001 | Fox et al. |
| 6,290,794 B1 | 9/2001 | Yates |
| D451,955 S | 12/2001 | Hanagata |
| 6,371,554 B1 | 4/2002 | Ko |
| 6,402,235 B1 | 6/2002 | Letendre |
| 6,402,236 B1 | 6/2002 | Yates |
| 6,450,572 B1 | 9/2002 | Kuipers |
| D463,676 S | 10/2002 | Minkow et al. |
| D466,031 S | 11/2002 | Mantovani |
| D469,703 S | 2/2003 | Stahl |
| 6,615,568 B1 | 9/2003 | Roskies |
| 6,625,897 B2 | 9/2003 | Tadin |
| 6,769,234 B2 | 8/2004 | Hadlock |
| 6,886,887 B2 | 5/2005 | Yu |
| 6,990,744 B2 | 1/2006 | Bieganek et al. |
| 7,273,250 B2 | 9/2007 | Oehler |
| 7,284,336 B2 | 10/2007 | Bird et al. |
| 7,341,308 B2 | 3/2008 | Milton |
| 7,367,619 B2 | 5/2008 | Fregonese et al. |
| 7,441,343 B2 | 10/2008 | Bird et al. |
| 7,445,292 B2 | 11/2008 | Moule |
| 7,448,141 B2 | 11/2008 | Bird et al. |
| 7,614,704 B2 | 11/2009 | Whelan et al. |
| 7,661,757 B2 | 2/2010 | Chuang |
| 7,699,392 B2 | 4/2010 | Chuang |
| 9,233,725 B2 | 1/2016 | Marcel |
| 9,529,213 B2 | 12/2016 | Fonte et al. |
| D784,033 S | 4/2017 | Li |
| 9,688,330 B2 | 6/2017 | Schiavon et al. |
| 9,788,600 B2 | 10/2017 | Wawrousek et al. |
| 9,836,883 B2 | 12/2017 | Tran et al. |
| 9,841,075 B2 | 12/2017 | Russo |
| D846,896 S | 4/2019 | Hain |
| D846,897 S | 4/2019 | Toll |
| D847,522 S | 5/2019 | Pruitt et al. |
| 10,633,048 B2 | 4/2020 | Pruitt et al. |
| D887,731 S | 6/2020 | Kim |
| D919,313 S | 5/2021 | Kim |
| 11,136,082 B2 | 10/2021 | Pruitt et al. |
| 11,186,336 B2 | 11/2021 | Primeaux et al. |
| 2002/0185897 A1 | 12/2002 | Crutch |
| 2003/0025364 A1 | 2/2003 | Antonio |
| 2004/0222685 A1 | 11/2004 | Steagall et al. |
| 2004/0232742 A1 | 11/2004 | Oehler |
| 2007/0176472 A1 | 8/2007 | Chuang |
| 2008/0079306 A1 | 4/2008 | Whelan et al. |
| 2008/0093898 A1 | 4/2008 | Chiang |
| 2009/0212608 A1 | 8/2009 | Rinard et al. |
| 2010/0045084 A1 | 2/2010 | Segato |
| 2014/0361463 A1 | 12/2014 | DeSimone et al. |
| 2016/0206102 A1 | 7/2016 | Aldrich et al. |
| 2017/0165908 A1 | 6/2017 | Pattinson et al. |
| 2017/0173880 A1 | 6/2017 | Desimone et al. |
| 2017/0232872 A1 | 8/2017 | Faruque et al. |
| 2018/0057089 A1 | 3/2018 | Toll |
| 2018/0070736 A1 | 3/2018 | Achten et al. |
| 2019/0061850 A1 | 2/2019 | Sung |
| 2019/0185089 A1 | 6/2019 | Pruitt et al. |
| 2020/0231237 A1 | 7/2020 | Pruitt et al. |
| 2021/0094641 A1 | 4/2021 | Li |
| 2021/0114677 A1 | 4/2021 | Perotto et al. |
| 2021/0129931 A1 | 5/2021 | Bigolinl et al. |
| 2022/0153372 A1 | 5/2022 | Drew |

FOREIGN PATENT DOCUMENTS

| | | |
|---|---|---|
| CN | 304524060 | 3/2018 |
| CN | 304605828 | 5/2018 |
| CN | 305147531 | 5/2019 |
| CN | 306721230 | 7/2021 |
| CN | 307574795 | 9/2022 |
| DE | 9415509 U | 1/1995 |
| DE | 20013834 | 1/2002 |
| DE | 20 2004 013799 U1 | 1/2006 |
| DE | 102011057020 | 6/2013 |

(56) References Cited

FOREIGN PATENT DOCUMENTS

| | | |
|---|---|---|
| DE | 10 2013 206727 A1 | 10/2014 |
| DE | 202017106247 | 11/2017 |
| EP | 0603138 | 6/1994 |
| EP | 0721880 | 7/1996 |
| EP | 1278675 | 11/2003 |
| EP | 1698545 | 9/2006 |
| EP | 1551690 | 9/2007 |
| EP | 1862382 | 12/2007 |
| EP | 2137054 | 11/2010 |
| EP | 2170688 | 10/2011 |
| GB | 2324989 | 11/1998 |
| JP | H08-150864 | 6/1996 |
| JP | H08-150976 | 6/1996 |
| TW | 197806 | 6/2019 |
| TW | D197806 | 6/2019 |
| WO | WO 1988/09738 | 12/1988 |
| WO | WO 1998/25810 | 6/1998 |
| WO | WO 1998/31584 | 7/1998 |
| WO | WO 1999/20517 | 4/1999 |
| WO | WO 2001/10704 | 2/2001 |
| WO | WO 2001/83286 | 11/2001 |
| WO | WO 2003/011679 | 2/2003 |
| WO | WO 2011/148272 | 12/2011 |
| WO | WO 2016/137818 | 9/2016 |
| WO | DM/204308 | 10/2020 |

OTHER PUBLICATIONS

"Rethinking foam—Carbon's lattice innovation", https://www.carbon3d.com, Dec. 6, 2017.
American Bicyclist & Motorcyclist, "The Seat", p. 32, Nov. 1989.
Bicycle Dealer Showcase, "The Hobson", p. 26, Apr. 1988.
Bicycling, "Pave", p. 37, Jun. 1997.
EC90 Bicycle seat saddle MTB road bike saddles mountain bike racing saddle PU breathable soft seat cushion, posted May 2, 2019 online, retrieved on Oct. 18, 2022, https://www.amazon.com/EC90-Bicycle-Saddles-Mountain-Breathable/dp/B07R95ZW3V (2019).
FlatBack Technologies, Inc. "The Cheat-A-Post.TM", 2 pp., Sep. 18, 1998, http://www.flatbacktech.com.
IPSXP Most comfortable bike seat, retrieved online Oct. 18, 2022, https://sportsridge.com/products/ipsxp-most-comfortable-bike-seat-mens-padded-bicycle-saddle-with-soft-cushion-improves-comfort-for-mountain-bike-hybrid-and-stationary-exercise-bike (2002).
Photocopy of ISCA Components Acessori per ciclo product brochure, "Selle"; unnumbered.
Selle Royal Respiro Soft Athletic Cycling Saddle, posted Nov. 17, 2009 online, retrieved Oct. 18, 2022, https://www.amazon.com/Selle-Royal-Respiro-Athletic-Saddle/dp/B009O0CZMI (2009).
SQ Popometer card.
SQ-lab wants to put through a ergonomic bike part concept, together with bike shops, www.sq-lab.com/englisch/press.tem (English version of article originally published in German in Feb. 2004).
"Saddles that keep blood flowing", Mountain Bike Action magazine, Feb. 2005.
Savage Bicycle Design L.C., "No Pain . . . No Gain . . . ? NOT", pp. 165, interbike Directory, 1998.
Specialized Smart Products Catalog, pp. 90, released at interbike Trade Show in Las Vegas on Sep. 11, 1998).
The Aero Bicycle Saddle, "Aero Saddle", 2 pp., Sep. 18, 1998, http://www.world-net.net/usersdrwest/.
"USA Vuelta Expands Offerings", Bike Pulse Bicycle Product and Industry Trends, vol. 2(9):28-29, (1998).
International Search Report for PCT/US98/21989, dated Feb. 9, 1999, in 3 pages.
International Search Report and Written Opinion for PCT/US2020/041843, dated Oct. 7, 2020.

BICYCLE SADDLE

CROSS-REFERENCE TO RELATED APPLICATIONS

This application is a continuation of U.S. patent application Ser. No. 17/454,892, filed Nov. 15, 2021, titled BICYCLE SADDLE, which is a continuation of U.S. patent application Ser. No. 16/927,765, filed Jul. 13, 2020, titled BICYCLE SADDLE, which claims priority to U.S. Provisional Patent App. No. 62/877,200, filed Jul. 22, 2019, titled BICYCLE SADDLE. Each of the foregoing applications is hereby incorporated by reference herein in its entirety.

TECHNICAL FIELD

The present technology relates to bicycles and, in particular, bicycle saddles.

DESCRIPTION OF THE RELATED TECHNOLOGY

Bicycle seats, or saddles, are designed to support much of the weight of a bicycle rider. Due to the relatively small surface area of a bicycle saddle, a significant amount of pressure can be applied to a small area of the rider's body, leading to discomfort over time. Particularly for extended rides, discomfort can arise when a significant amount of force is being continually applied to a rider's ischial tuberosities ("sit bones").

SUMMARY

The systems, methods, and devices described herein have innovative aspects, no single one of which is indispensable or solely responsible for their desirable attributes. Without limiting the scope of the claims, some of the advantageous features will now be summarized.

The present disclosure includes improved bicycle saddles that incorporate multiple strategically sized and positioned stiffness regions, to more evenly distribute loads on and around a rider's sit bones. Such saddles can enable a more comfortable ride, which can also lead to increased performance, particularly on extended rides. For example, in some embodiments, a bicycle saddle comprises at least three nested stiffness regions on either lateral side of the saddle. The nested stiffness regions comprise at least an innermost region having a relatively low stiffness, a region surrounding the innermost region that has a somewhat higher stiffness, and another region surrounding the second region that has an even higher stiffness. The innermost region can be positioned at a point on the saddle that would generally experience the highest pressure from a rider's sit bones. Such a configuration can help to provide more consistent pressure around the rider's sit bones, as opposed to putting point loads on the sit bones, which can lead to decreased discomfort over time.

According to some embodiments, a bicycle saddle comprises: a base structure comprising a top portion and a first rail and a second rail that support the top portion, wherein each of the first rail and the second rail comprises a mounting portion configured to be coupled to a saddle receiver, the mounting portion extending along a rail axis, the rail axis of the first rail and the rail axis of the second rail defining a lateral plane that contains both the rail axis of the first rail and the rail axis of the second rail and a longitudinal plane that is perpendicular to the lateral plane and centered between the rail axis of the first rail and the rail axis of the second rail; and a cushion coupled to the top portion of the base structure, the cushion comprising a nose portion and a rear portion, the cushion further comprising a first lateral side and a second lateral side separated by the longitudinal plane, wherein each of the first lateral side and the second lateral side comprises: a first region comprising a first stiffness; a second region comprising a second stiffness that is less than or equal to 75% of the first stiffness, but greater than 50% of the first stiffness; and a third region comprising a third stiffness that is less than or equal to 50% of the first stiffness, wherein, when a top surface of the cushion is projected as a two-dimensional projection onto a plane above the cushion that is parallel to the lateral plane, the first region, the second region, and the third region of each of the first lateral side and the second lateral side is configured such that: a perimeter of the second region is at least 75% enclosed within the first region, a perimeter of the third region is at least 75% enclosed within the second region, a centroid of the second region is positioned longitudinally between a first line that is perpendicular to the longitudinal plane and intersects a widest point of the rear portion of the cushion, and a second line that is perpendicular to the longitudinal plane and positioned halfway between the first line and a forward-most point of the nose portion of the cushion, the centroid of the second region is positioned laterally between a third line that is parallel to the longitudinal plane and a fourth line that is parallel to the longitudinal plane, wherein each of the third line and the fourth line passes through the first region, the third line being spaced apart from the longitudinal plane by a distance that is 15% of a distance from the longitudinal plane to the widest point of the rear portion of the cushion, the fourth line being spaced apart from the longitudinal plane by a distance that is 70% of the distance from the longitudinal plane to the widest point of the rear portion of the cushion, a centroid of the third region is positioned longitudinally between the first line and a fifth line that is positioned between the first line and the second line, the fifth line being spaced apart from the first line by a distance that is 45% of a distance from the first line to the forward-most point of the nose portion of the cushion, the centroid of the third region is positioned laterally between a sixth line that is parallel to the longitudinal plane and the fourth line, wherein the sixth line passes through the first region and is spaced apart from the longitudinal plane by a distance that is 10% of the distance from the longitudinal plane to the widest point of the rear portion of the cushion, the perimeter of the third region encloses a first surface area, the perimeter of the second region encloses a second surface area, wherein a size of the second surface area, minus a size of the first surface area, is between 1,000 mm$^2$ and 10,000 mm$^2$, and wherein the size of the first surface area is between 25% and 75% of the size of the second surface area.

In some embodiments, the cushion is an assembly that comprises separate resilient materials having different stiffness properties for the first region, the second region, and the third region. In some embodiments, each of the separate resilient materials comprises a foam. In some embodiments, the first region, the second region, and the third region are part of a single integrally formed structure, the single integrally formed structure comprising different stiffness properties in the first region, the second region, and the third region. In some embodiments, a shape of the perimeter of the second region comprises a maximum length and widths including a maximum width, with the maximum length being greater than the maximum width, and with the widths tapering from a larger value to a smaller value from a rearward portion of the second region to a forward portion of the second region. In some embodiments, a shape of the perimeter of the third region comprises a maximum length and widths including a maximum width, with the maximum length being greater than the maximum width, and with the widths tapering from a larger value to a smaller value from a rearward portion of the third region to a forward portion of the third region. In some embodiments, the perimeter of the second region is completely enclosed within the first region. In some embodiments, the perimeter of the third region is completely enclosed within the second region. In some embodiments, the first stiffness is within a range of 50-70 on the Asker C hardness scale. In some embodiments, when the top surface of the cushion is projected as the two-dimensional projection onto the plane above the cushion that is parallel to the lateral plane, a surface area of the first region consists of any portion of the top surface that is not part of the second region, that is not part of the third region, and that is bounded by a perimeter defined by multiple segments comprising: a first segment that begins at a point where the second line intersects the longitudinal plane and ends at a point where the second line intersects an outer edge of the cushion, the first segment being collinear to the second line; a second segment that begins at the point where the second line intersects the outer edge of the cushion, follows a profile of the outer edge of the cushion, and ends at a point where the outer edge of the cushion intersects the longitudinal plane; and a third segment that begins at the point where the outer edge of the cushion intersects the longitudinal plane, ends at the point where the second line intersects the longitudinal plane, the third segment being coincident to the longitudinal plane. In some embodiments, the cushion comprises one or more recessed regions that are recessed below the top surface of the cushion and that are not part of the surface area of the first region. In some embodiments, each of the first stiffness, the second stiffness, and the third stiffness is defined as an average stiffness as measured normal to the top surface of the cushion at uniformly spaced locations across a corresponding region of the first region, the second region, and the third region, using a durometer having a 0.508 centimeter spherical diameter indenter. In some embodiments, adjacent uniformly spaced locations of the uniformly spaced locations are located 10 millimeters apart from each other. In some embodiments, when the top surface of the cushion is projected as the two-dimensional projection onto the plane above the cushion that is parallel to the lateral plane, each of the first lateral side and the second lateral side further comprises: a first transition zone having an outer perimeter and an inner perimeter defined by offsetting the perimeter of the second region outward by 5 millimeters and inward by 5 millimeters; and a second transition zone having an outer perimeter and an inner perimeter defined by offsetting the perimeter of the third region outward by 5 millimeters and inward by 5 millimeters, wherein each of the second stiffness and the third stiffness is defined as an average stiffness as measured normal to the top surface of the cushion at uniformly spaced locations across a corresponding region of the second region and the third region, excluding any transition zones, using a durometer having a 0.508 centimeter spherical diameter indenter. In some embodiments, adjacent uniformly spaced location of the uniformly spaced locations are located 10 millimeters apart from each other. In some embodiments, the perimeter of the second region and the perimeter of the third region both are located rearward of the nose portion of the cushion, wherein a rearmost extent of the nose portion is defined by the second line. In some embodiments, an effective width of the third region is within a range of 40%-70% of an effective width of the second region. In some embodiments, an effective width of the second region is within a range of 20%-50% of an effective width of the first region.

According to some embodiments, a bicycle saddle comprises: a base structure comprising a top portion; and a cushion coupled to the top portion of the base structure, the cushion comprising a nose portion, a rear portion, and a longitudinal plane positioned at a lateral midpoint of a widest point of the cushion, the longitudinal plane extending from a rear of the rear portion to a front of the nose portion, wherein the cushion further comprises a first lateral side and a second lateral side separated by the longitudinal plane, wherein each of the first lateral side and the second lateral side comprises: a first region comprising a first stiffness; a second region comprising a second stiffness that is less than the first stiffness; and a third region comprising a third stiffness that is less than the second stiffness, wherein, when a top surface of the cushion is projected as a two-dimensional projection onto a lateral plane, the first region, second region, and third region of each of the first lateral side and the second lateral side are configured such that: a perimeter of the second region is at least 75% enclosed within the first region, and a perimeter of the third region is at least 75% enclosed within the second region, and wherein the lateral plane is perpendicular to the longitudinal plane, and the lateral plane is oriented such that one of: the lateral plane is coincident with a highest point of the nose portion of the cushion and a highest point of the rear portion of the cushion, or the lateral plane is parallel to two rail axes, each of the two rail axes being defined by a mounting portion of a rail that supports the top portion of the base structure.

In some embodiments, the second stiffness of the second region is no greater than 75% of the first stiffness of the first region. In some embodiments, the third stiffness of the third region is no greater than 50% of the first stiffness of the first region. In some embodiments, a surface area of a top surface of the third region is between 25% and 75% of a surface area of a top surface of the second region. In some embodiments, the perimeter of the second region extends no further forward than half a longitudinal distance between the widest point of the cushion and the front of the nose portion.

According to some embodiments, a bicycle saddle comprises: a base structure comprising a top portion; and a cushion coupled to the top portion of the base structure, the cushion comprising a nose portion and a rear portion, the cushion further comprising a first lateral side and a second lateral side separated by a longitudinal plane defined by a plane of symmetry between the first lateral side and the second lateral side, wherein a lateral plane is defined as a plane that is perpendicular to the longitudinal plane and oriented such that the lateral plane is coincident with a highest point of the nose portion of the cushion and a highest point of the rear portion of the cushion, wherein each of the first lateral side and the second lateral side comprises: a first region comprising a first stiffness; a second region comprising a second stiffness that is less than or equal to 75% of the first stiffness, but greater than 50% of the first stiffness; and a third region comprising a third stiffness that is less than or equal to 50% of the first stiffness, wherein, when a top surface of the cushion is projected as a two-dimensional projection onto the lateral plane, the first region, second region, and third region of each of the first lateral side and the second lateral side is configured such that: a perimeter of the second region is at least 75% enclosed within the first region, a perimeter of the third region is at least 75% enclosed within the second region, a centroid of the second region is positioned longitudinally between a first line that is perpendicular to the longitudinal plane and intersects a widest point of the rear portion of the cushion, and a second line that is perpendicular to the longitudinal plane and positioned halfway between the first line and a forward-most point of the nose portion of the cushion, the centroid of the second region is positioned laterally between a third line that is parallel to the longitudinal plane and a fourth line that is parallel to the longitudinal plane, wherein each of the third line and the fourth line passes through the first region, the third line being spaced apart from the longitudinal plane by a distance that is 15% of a distance from the longitudinal plane to the widest point of the rear portion of the cushion, the fourth line being spaced apart from the longitudinal plane by a distance that is 70% of the distance from the longitudinal plane to the widest point of the rear portion of the cushion, a centroid of the third region is positioned longitudinally between the first line and a fifth line that is positioned between the first line and the second line, the fifth line being spaced apart from the first line by a distance that is 45% of a distance from the first line to the forward-most point of the nose portion of the cushion, the centroid of the third region is positioned laterally between a sixth line that is parallel to the longitudinal plane and the fourth line, wherein the sixth line passes through the first region and is spaced apart from the longitudinal plane by a distance that is 10% of the distance from the longitudinal plane to the widest point of the rear portion of the cushion, the perimeter of the third region encloses a first surface area, the perimeter of the second region encloses a second surface area, wherein a size of the second surface area, minus a size of the first surface area, is between 1,000 $mm^2$ and 10,000 $mm^2$, and wherein the size of the first surface area is between 25% and 75% of the size of the second surface area.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Like reference numbers and designations in the various drawings indicate like elements.

DETAILED DESCRIPTION

Figure 1:
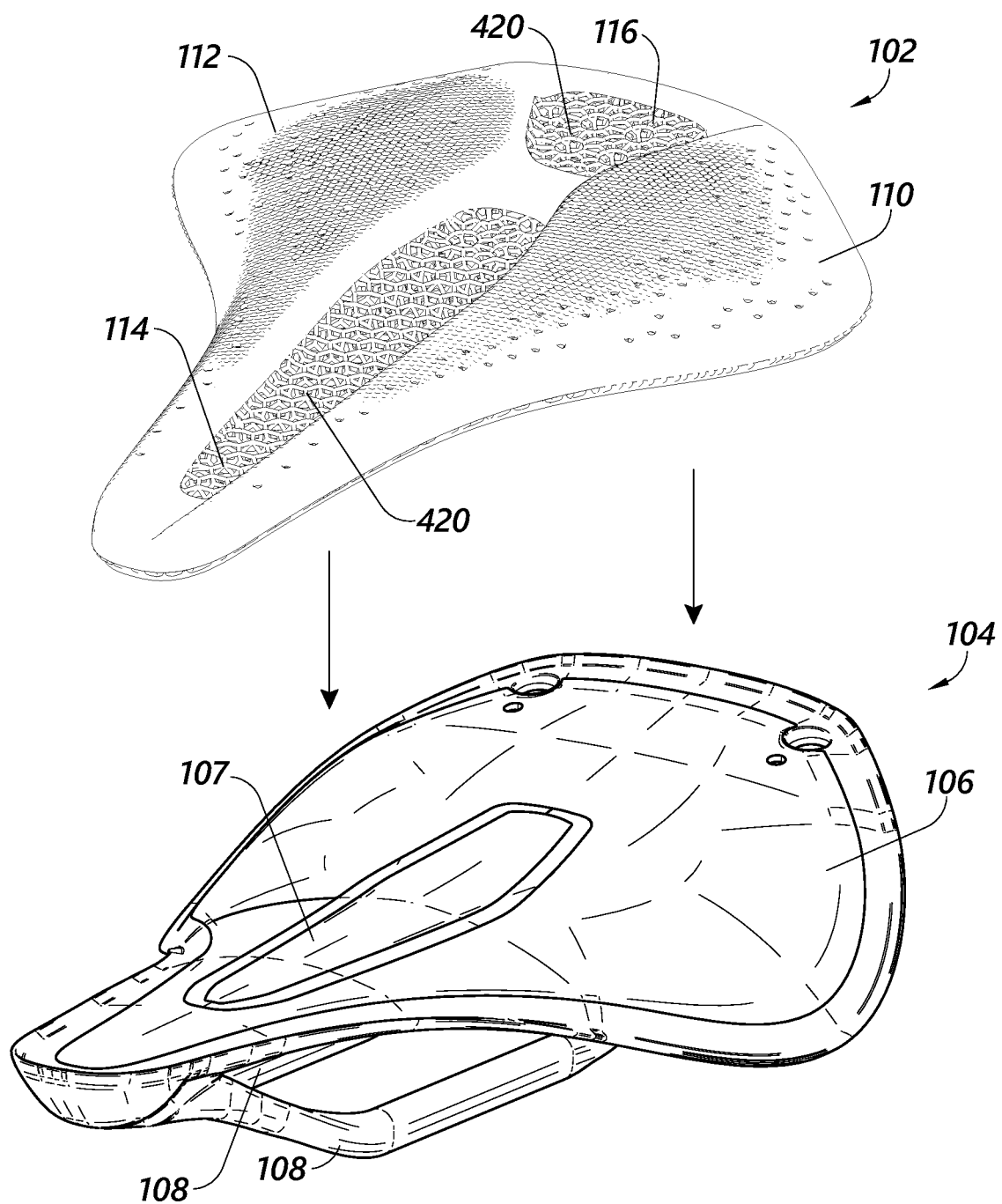
FIG. 1 is an exploded perspective view of one embodiment of a bicycle saddle cushion and base.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention. Descriptions of unnecessary parts or elements may be omitted for clarity and conciseness, and like reference numerals refer to like elements throughout. In the drawings, the size and thickness of layers and regions may be exaggerated for clarity and convenience.

Bicycle ergonomics is becoming increasingly important as more people get into cycling for pleasure, competition, and/or transportation. One important aspect of bicycle ergonomics is the saddle, which supports a significant portion of a rider's weight in a relatively small surface area. Conventional wisdom has been that you can achieve a more comfortable ride and mitigate or prevent rider injury by moving support in the saddle to the sit bones and away from the tailbone and soft tissue. For example, moving support in the saddle to the sit bones can mitigate or prevent pain of the rider's coccyx ("tailbone") and/or occlusion of the rider's circulatory system at the perineum. However, through testing it has been discovered that putting point loads on the sit bones can still result in discomfort over time, and that a better result can be achieved by distributing the loads on and around the sit bones over regions of varying stiffness. The present disclosure discloses various embodiments of bicycle saddles that accomplish such better-distributed loading.

In some embodiments, a bicycle saddle comprises a cushion with each lateral side having a plurality of nested stiffness regions each having a different stiffness level. For example, a first stiffness region may enclose a second stiffness region, and the second stiffness region may enclose a third stiffness region. The first stiffness region may have a certain stiffness, with the second stiffness region having a lower stiffness, and the third stiffness region having an even lower stiffness. The third stiffness region can, for example, be positioned such that it will be directly underneath a rider's ischial tuberosity ("sit bone"). By having the third region surrounded by regions of increasing stiffness, the user's sit bone can be more comfortably supported.

Various embodiments implement such multiple stiffness regions using various methods. For example, a saddle cushion may comprise resilient materials, such as foam and/or rubber, and different resilient materials having a different stiffness level can be used for each distinct stiffness region. As one example, a majority of the saddle cushion may comprise a resilient material A having a first stiffness, with that material formed into a general shape of the saddle, but with a void on either lateral side for insertion of other regions. Another resilient material B may have a lower stiffness than the first stiffness and be sized to fit within the void of resilient material A. Further, the resilient material B may have a void that has positioned therein a resilient material C that has an even lower stiffness than resilient material B. Such resilient materials A, B, and C may, for example, be used to form Regions A, B, and C of the saddle shown in FIG. 2, instead of the 3-D lattice structure discussed in greater detail below.

As another example, some embodiments may implement the varying stiffness regions in a monolithic cushion. In some embodiments, the monolithic cushion may be produced using 3-D printing technologies. For example, a bicycle saddle cushion may be produced as a single monolithic component that comprises a 3-D lattice structure, with specific properties of the 3-D lattice structure varied in certain regions in order to result in differences in stiffnesses in those regions. The 3-D lattice structure may comprise an elastomeric material in order to form a resilient structure.

In some embodiments, the size, shape, and/or position of the various stiffness regions can be set such that they maximize comfort for a majority of riders. In some embodiments, the size, shape, and/or position of the various stiffness regions can be custom made for a specific rider's anatomy.

As used herein with respect to the stiffness regions, the terms "nested" and "enclosed," when used without a qualifier such as "partially" and/or a certain percentage, mean that, as viewed from above as a two-dimensional projection onto a plane (e.g., as in FIG. 2), the outer perimeter of one stiffness region is completely within an area defined by the outer perimeter of another stiffness region. In some embodiments, as further described below, a region may be described as only partially enclosed or partially nested within another region. Such usage means that a first portion of a first region's perimeter is coincident with a portion of a second region's perimeter, and a second portion of the first region's perimeter is not coincident with the second region's perimeter. For example, a first region that is described as 75% enclosed within a second region means that, as viewed from above as a two-dimensional projection onto a plane (e.g., as in FIG. 2), 75% of the outer perimeter of the first stiffness region is coincident with the outer perimeter of the second stiffness region, and the other 25% of the outer perimeter of the first stiffness region is not coincident with the outer perimeter of the second stiffness region. As discussed below, if there is a transition zone between two stiffness regions, then the regions' perimeters can be considered to be located at a middle of the transition zone (e.g., positioned such that distances from the perimeter to the edge of the transition zone on either side of the perimeter, measured perpendicular to a line tangent to the perimeter, are equal).

Bicycle Saddle

FIGS. 1-4 illustrate an example embodiment of a bicycle saddle 100, and components thereof. The saddle 100 comprises multiple stiffness regions, and can be designed to increase the comfort and/or prevent injury of a bicycle rider. FIG. 1 illustrates an exploded view of two components of the saddle 100, namely a cushion 102 and a base structure 104. The base structure 104 can comprise a pair of rails 108 that support a top portion 106. The pair of rails 108 can be configured to be coupled to a bicycle, such as, for example, at a bicycle receiver (e.g., a saddle post). The cushion 102 can be conformed to and connected to the top portion 106. In some embodiments, a covering may then be positioned over the cushion 102 and at least a portion of the top portion 106. In some embodiments, a covering may not be used. The top portion 106 of the base structure 104 further comprises a void 107 that can be covered by a membrane (but may not be covered by a membrane in some embodiments). The void 107 may be positioned generally beneath the recessed region 114 of the cushion 102.

Figure 2:
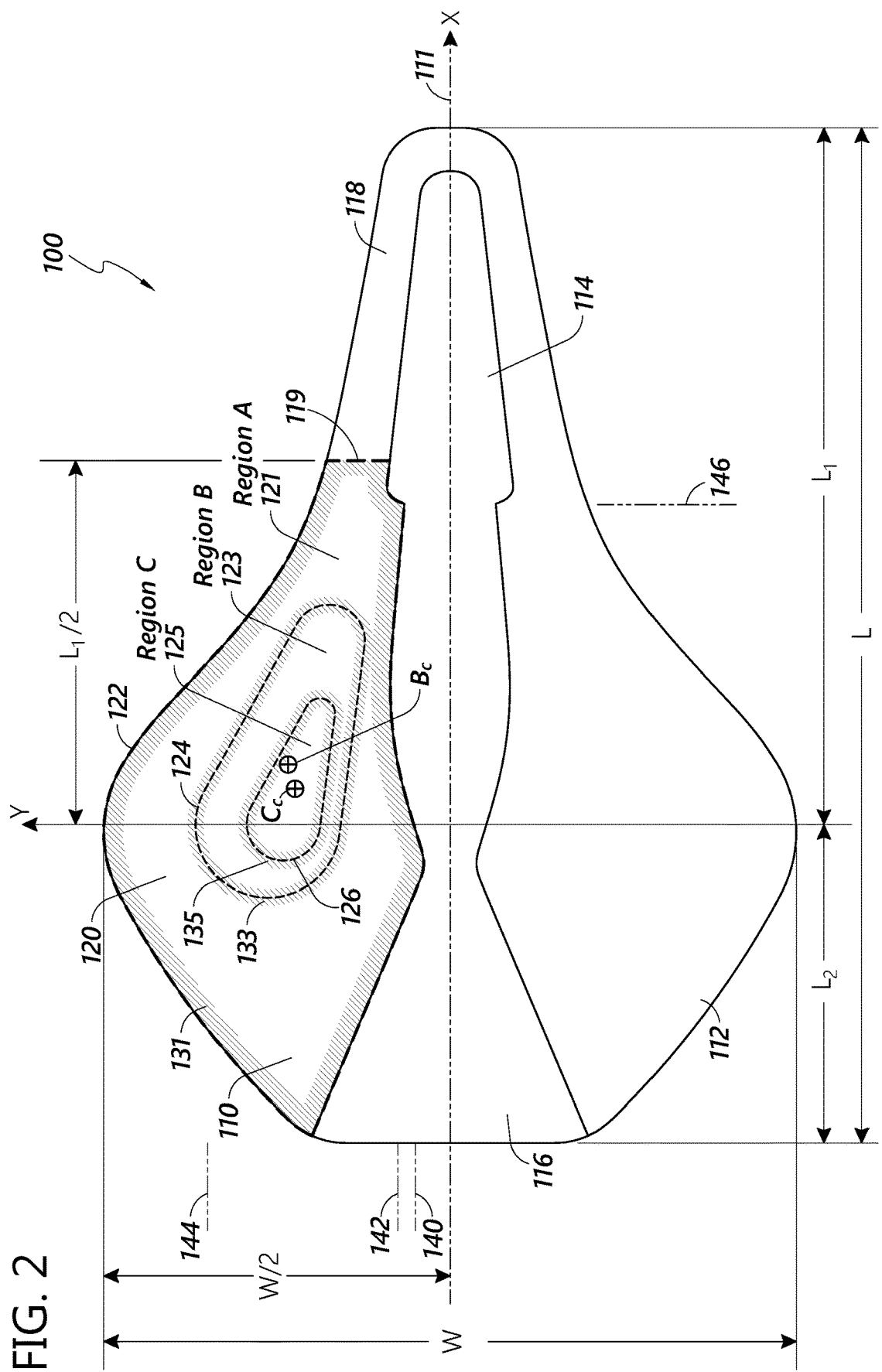
FIG. 2 is a top view of one embodiment of an assembled saddle.

FIG. 2 illustrates a top view of saddle 100, with the cushion 102 conformed to and coupled to the base 104. For clarity in showing the details of the stiffness regions, some other details of the cushion 102 that can be seen in other figures are not shown in FIG. 2, such as details of the holes 402 and lattice structure in the recessed regions 114, 116. In some embodiments, the top portion 106 of the base 104 comprises a rigid or relatively rigid material, such as a polymer, carbon fiber, metal, and/or the like. The cushion 102, on the other hand, can comprise a resilient material, such as rubber, foam, elastomeric material, and/or the like. In the various figures provided herewith that illustrate the cushion 102 as a separate component, the cushion 102 is shown in an unassembled state, where the bottom surface of the cushion 102 is substantially flat. Once the cushion 102 is assembled to the base 104, however, the cushion 102 can be formed to a contour of the top portion 106 of the base 104. Accordingly, it may be noted that the general outer profile of the assembled saddle 100 shown in FIG. 2 is somewhat different than the general outer profile of the unassembled cushion 102 illustrated in FIG. 4A and other figures.

Figure 3A:
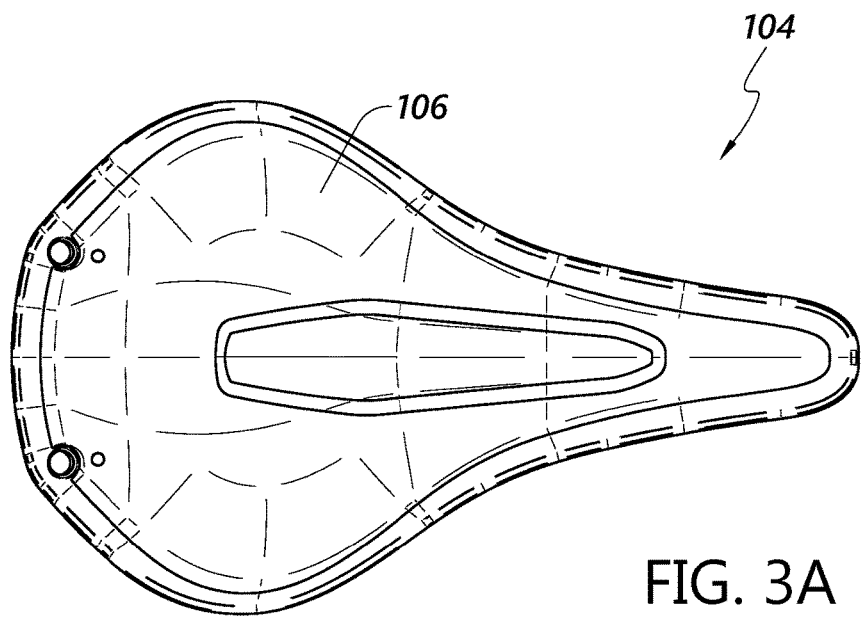
FIG. 3A illustrates a top view of the saddle base of FIG. 1.
Figure 3B:
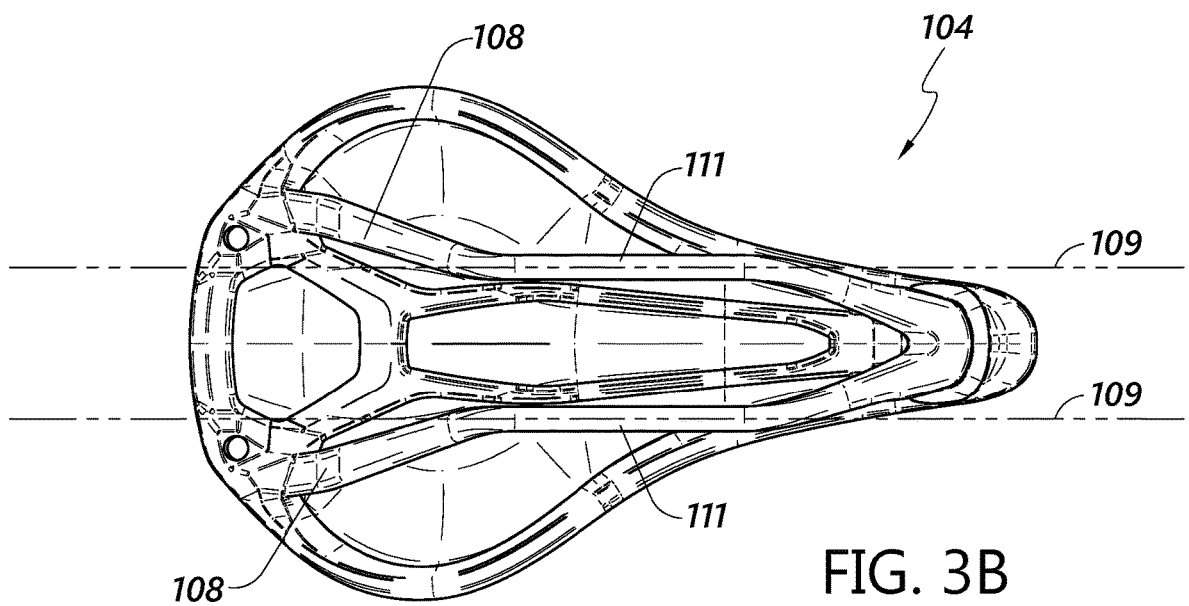
FIG. 3B illustrates a bottom view of the saddle base of FIG. 1.
Figure 3C:
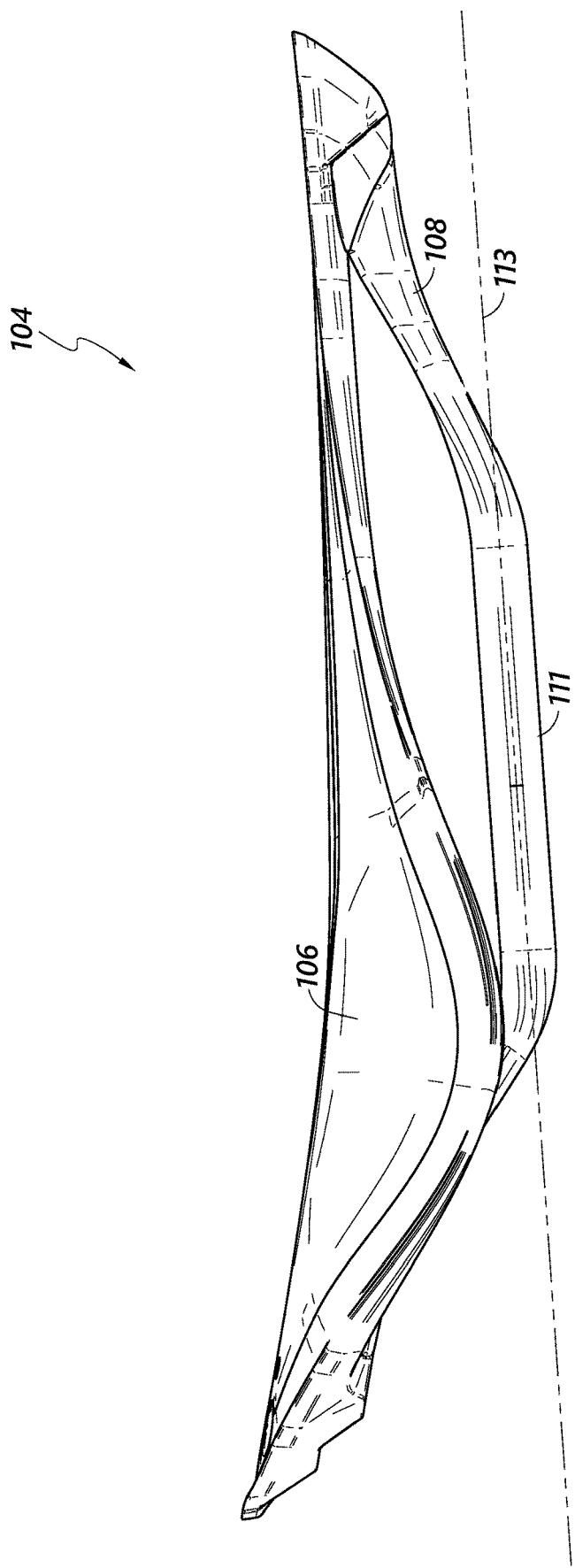
FIG. 3C illustrates a side view of the saddle base of FIG. 1.

The top view of FIG. 2 is oriented normal to lateral plane 113 shown in FIG. 3C. FIG. 2 also illustrates a two-dimensional coordinate system. The x-axis is positioned at a lateral center of the saddle 100, such as at a line of symmetry between left lateral side 110 and right lateral side 112 (e.g., at the midpoint of the saddle width W). The x-axis also defines a longitudinal plane 111 (also shown in FIGS. 4B and 4C), which is a plane that contains the x-axis and is oriented perpendicular to the lateral plane 113. The y-axis is positioned perpendicular to the x-axis and positioned longitudinally at the widest part of the saddle 100 (e.g., the part of the saddle that defines the saddle width W).

In some embodiments, the convex lateral profile of the rear portion of the saddle 100 allows for a single widest point that defines the positioning of the y-axis. In other embodiments, a saddle that comprises a flat or concave portion at the widest portion of the saddle can be implemented, and the y-axis can be positioned at the longitudinal midpoint of that flat or concave portion. In such an embodiment, for the purposes of this specification, the "widest point" of the rear portion of the saddle is defined as the longitudinal midpoint of the flat or concave portion, and any disclosure and/or claims that reference a "widest point" of the rear portion of the saddle are intended to cover such a saddle configuration, unless stated otherwise.

The saddle 100 comprises a nose portion 118 and a rear portion 120. The rear portion 120 is defined as the portion of the saddle rearward of the y-axis, and the portion of the saddle forward of the y-axis up to line 119. The nose portion 118 is defined as the portion of the saddle that is forward of line 119. Line 119 is oriented parallel to the y-axis and positioned halfway between the y-axis and a forward-most point of the saddle (e.g., shown by dimension L1/2).

The saddle 100 further comprises a left lateral side 110 and a right lateral side 112, separated by the longitudinal plane 111. The saddle 100 may further comprise one or more recessed regions 114, 116 that are can be recessed below other areas of the top surface of the saddle 100, such that the recessed areas or regions can support little or no rider weight. In some embodiments, one or more of the recessed regions may be a void completely through the saddle, instead of merely a portion recessed below surrounding portions of the saddle. Further, in some embodiments, some or all of the recessed regions may not be present. In some embodiments, the recessed region or regions can be shaped and positioned such that they are mirrored across the longitudinal plane 111. In some embodiments, the recessed region or regions comprise a centroid that is within 5 millimeters (mm) of the longitudinal plane 111. In some embodiments, the recessed region or regions comprise a centroid that is within 2% of the distance W/2 from the longitudinal plane 111.

The saddle 100 illustrated in FIG. 2 further comprises a variety of stiffness regions, which are described in further detail below.

FIGS. 3A-3D illustrate various views of the base portion 104 of the saddle 100. FIG. 3A is a top view, and FIG. 3B is a bottom view. FIG. 3B illustrates that the rails 108 each comprise a mounting portion 111 that can comprise an elongate cylindrical structure for mounting to a component of a bicycle saddle post. The mounting portions 111 can each define a rail axis 109 extending along the mounting portions 111, as shown in FIG. 3B.

FIG. 3C illustrates a side view of the base portion 104. FIG. 3C further illustrates a lateral plane 113 defined as a plane that contains both rail axes 109. The lateral plane 113 is used to orient the top view shown in FIG. 2. Stated another way, the top view of the assembled saddle 100 shown in FIG. 2 is viewed normal to lateral plane 113 of FIG. 3C.

Figure 3D:
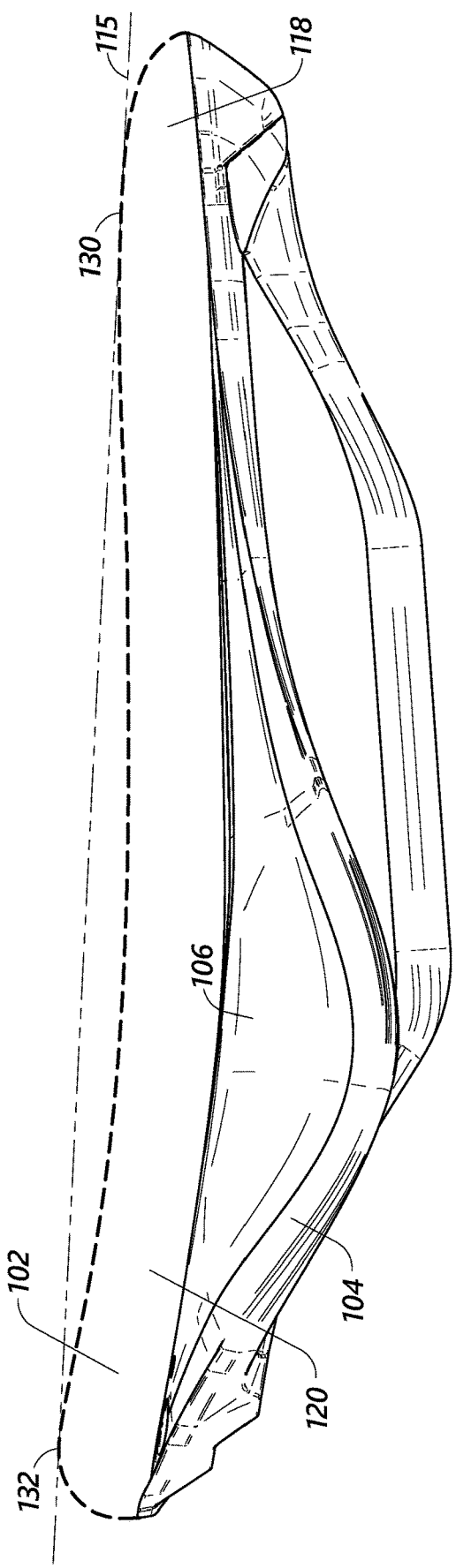
FIG. 3D illustrates a side view of the saddle base of FIG. 1, with a cushion connected thereto.

FIG. 3D illustrates an alternative lateral plane 115 that could be used to orient a top view similar to FIG. 2. In this drawing, the lateral plane 115 is defined as a plane that is perpendicular to a longitudinal plane of the saddle (such as longitudinal plane 111 shown in FIG. 2), and that contacts the highest point 130 of the nose portion 118 and the highest point 132 of the rear portion 120. Although the description below of the various sizes and positions of stiffness regions is given with respect to FIG. 2, which is oriented normal to lateral plane 113 of FIG. 3C, the various sizes and positions of the stiffness regions can also be applied to a drawing similar to FIG. 2, but oriented normal to lateral plane 115. Such an alternative view can be desirable, for example, if a multiple stiffness saddle similar to the designs disclosed herein is created, but uses a different type of saddle mounting mechanism than the saddle rails 108.

Figure 4A:
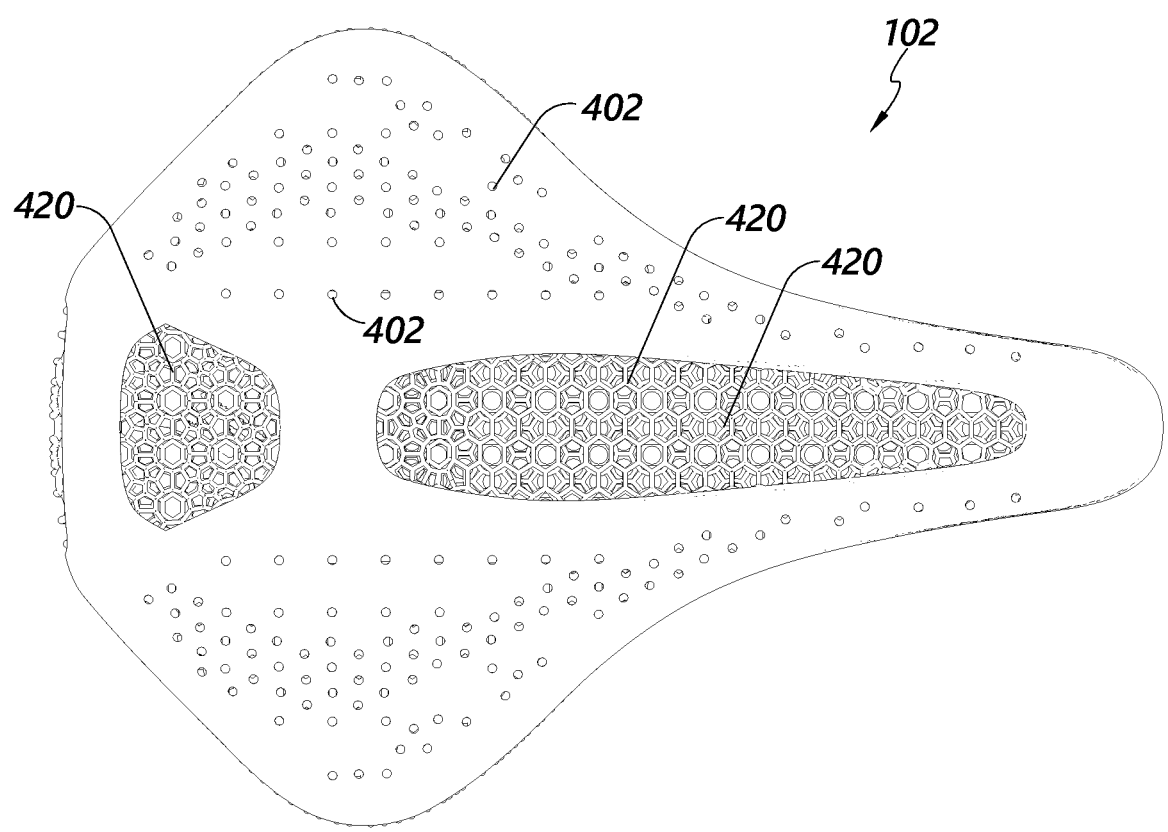
FIG. 4A illustrates a top view of the saddle cushion of FIG. 1.
Figure 4B:
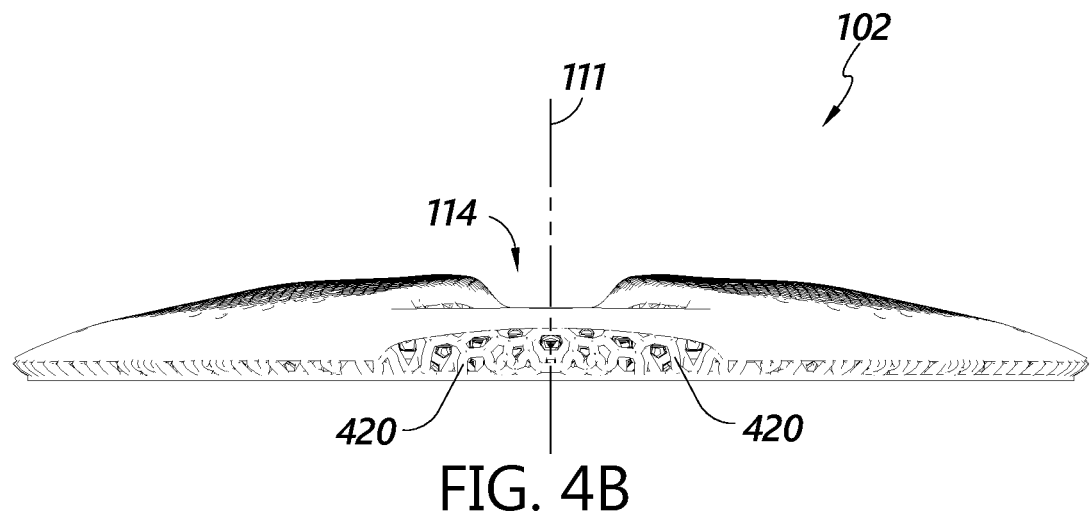
FIG. 4B illustrates a back view of the saddle cushion of FIG. 1.
Figure 4C:
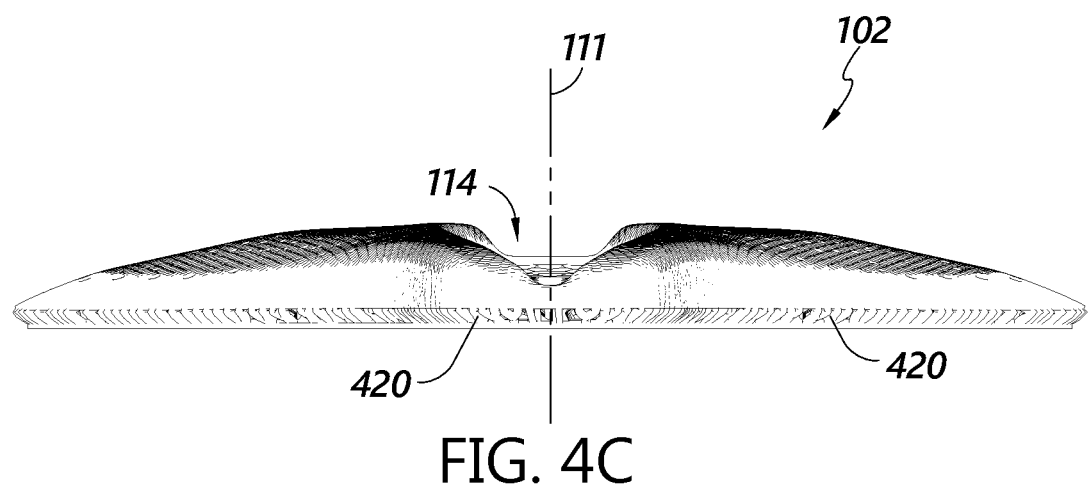
FIG. 4C illustrates a front view of the saddle cushion of FIG. 1.
Figure 4D:
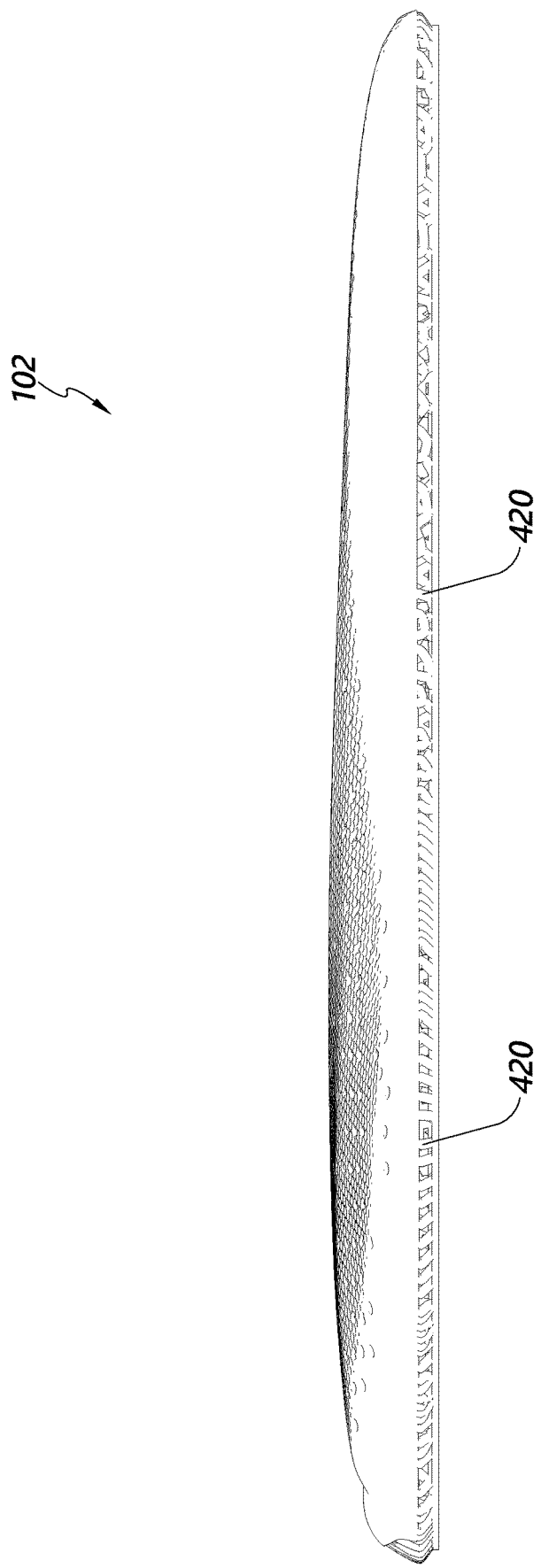
FIG. 4D illustrates a side view of the saddle cushion of FIG. 1.

FIGS. 4A-4D illustrate various views of the cushion 102. As discussed above, the shape of the cushion 102 illustrated in these figures is the unassembled shape, and the final assembled shape of the cushion 102 will be different when the cushion 102 is conformed to the top portion 106 of the saddle base 104. FIG. 4A is a top view, FIG. 4B is a back view, FIG. 4C is a front view, and FIG. 4D is a side view.

With reference to the top view of FIG. 4A, the cushion 102 comprises a plurality of holes or voids 402 in the top surfaces. Additional holes are voids may also be present in other surfaces, such as the bottom surface. In some embodiments, when the cushion 102 is manufactured using a 3-D printing process, these holes or voids 402 may be a remnant from the manufacturing process, such as holes used for draining resin during the 3-D printing process. In some embodiments, some or all of these holes or voids 402 may not be present.

Each of FIGS. 4A-4D illustrates some of the three dimensional lattice structures that contribute to the different stiffness regions in the saddle 100. The lattice structure can comprise a plurality of struts 420 that are arranged in a variety of directions to form a plurality of interconnected cells. The stiffness of particular regions of the cushion 102 may be determined by the specific size, shape, orientation, spacing, and/or the like of the plurality of struts 420. In some embodiments, the difference in stiffness between two regions can be determined by a difference in diameter of struts 420 in those regions.

In some embodiments, the specific three dimensional lattice structure of the cushion 102 is automatically computer-generated based on the desired properties of the cushion. For example, a designer of the saddle cushion 102 may determine that the desired properties for the stiffness regions are as described in greater detail below with reference to FIG. 2. Once the designer knows the desired end result, the designer may input such information into the computer system that automatically generates a three dimensional lattice structure that complies with the desired end result. Additional information about such three dimensional lattice structure and three-dimensional printing technology is described below.

As mentioned above, although the illustrated embodiment of a cushion 102 comprises multiple stiffness regions defined by the properties of a three dimensional lattice structure of a single integrated cushion, other embodiments may implement similar stiffness regions using more traditional manufacturing techniques, such as connecting together various pieces of rubber and/or foam having different levels of stiffness.

Stiffness Regions

Returning to FIG. 2, FIG. 2 further illustrates a plurality of stiffness regions that can be configured to comfortably support a rider's sit bones without placing a significant point load on the rider's sit bones. For clarity, all dimensions, perimeters, regions, shapes, and the like described with respect to FIG. 2 are described in reference to a two-dimensional projection of the top surface of the saddle 100 projected upward to a plane that is parallel to the lateral plane 113 shown in FIG. 3C. If a different lateral plane is used, such as the lateral plane 115 of FIG. 3D, then the two-dimensional projection is to that plane, or another plane parallel with that plane. Also, for clarity, the drawing and discussion focus on features of the left lateral side 110 of the saddle 100. In some embodiments, the same features of the left lateral side 110 are mirrored across the longitudinal plane 111 on the right lateral side 112.

In the embodiment of FIG. 2, three different stiffness regions are called out, namely region A (121), region B (123), and region C (125). In some embodiments, region C is enclosed within region B, and region B is enclosed within region A. Further, in some embodiments, region C comprises a lower stiffness and region B, and region B comprises a lower stiffness than region A. Other stiffness regions may also be included in some embodiments.

Region C comprises an outer perimeter 126 that can be positioned within the outer perimeter 124 of region B. Further, the outer perimeter 124 of region B can be positioned within the outer perimeter 122 of region A. The saddle is not limited to only the three stiffness regions discussed, and some embodiments may include additional stiffness regions. For example, in some embodiments, the surface area encompassed by the perimeter 124 of region B may include more than two stiffness regions, such as three, four, or five stiffness regions. Further, the surface area encompassed by the perimeter 122 of region A may comprise one or more different stiffness regions in areas other than the surface area encompassed by the perimeter 124 of region B. Further, the nose portion 118 may comprise the same stiffness as region A or may have a different stiffness than region A.

As is shown in FIG. 2, the perimeter 122 of region A does not include any of the recessed regions 114, 116. In embodiments that do not have recessed regions 114, 116 (or similar recessed regions), the perimeter of region A is considered to extend to the x-axis. For example, line 119 that defines the forwardmost portion of perimeter 122 would extend downward to the x-axis, the rearmost portion of perimeter 122 would follow the outer perimeter of the cushion downward until it meets the x-axis, and the perimeter 122 would include the portion of the x-axis that is between line 119 and the point where the x-axis intersects the rear edge of the cushion.

Although the embodiment of FIG. 2 is shown having region C completely enclosed within region B, and region B completely enclosed within region A, other embodiments may have one or more of the regions only partially enclosed within another region. For example, with reference to the orientation of FIG. 2, if region C were rotated clockwise about centroid $C_C$ somewhat (such as 45 degrees), the lower right end of the perimeter 126 would pass through and extend beyond the currently shown perimeter 124 of region B. In such a case, region B's perimeter 124 would no longer be the illustrated teardrop shape. Rather, for the portion of region C that remains within the currently shown teardrop shape of perimeter 124, the perimeter of region B would be coincident with region C's perimeter. For the portion of region C that extends outward beyond the currently shown teardrop shape of perimeter 124, region C's perimeter would not be coincident with region B's perimeter. If the portion of region C's perimeter that remains within the currently shown teardrop shape of perimeter 124 were 75% of the total perimeter of region C, then region C would be considered to be 75% enclosed by region B. A similar configuration could arise with respect to regions B and A if, for example, region B were moved or shaped differently such that a portion of region B's perimeter 124 extends beyond the currently shown perimeter 122 of region A. In an embodiment where a region is not completely enclosed within another region, the extent to which one region is enclosed by another region is defined as the percentage of the partially enclosed region's perimeter that is coincident with the perimeter of the enclosing region. For example, in some embodiments, one stiffness region (such as region B and/or C) is at least 95%, 90%, 85%, 80%, 75%, 70%, 65%, 60%, 55%, or 50% enclosed within another region.

For clarity, although FIG. 2 illustrates distinct perimeters 122, 124, and 126 of the three regions, such perimeters may or may not be visible to an end user of the saddle. For example, in some embodiments, a graphic on the cushion (or a cover over the cushion) may indicate a general size, shape, and location of, for example, region B, although such graphics are not required. Further, although the perimeters 122, 124, 126 are illustrated as lines, the transition in stiffness from one region to another may not be a sharp change that occurs exactly at the perimeter line. For example, in a composite structure that forms the various regions using different pieces of resilient material that are connected together, the transition in stiffness between the various regions may be relatively sharp. In a three dimensional lattice structure as described herein, however, the transition in stiffness between the various zones may be more gradual. Having a more gradual transition in stiffness between the various zones can be desirable, because it can lead to a more comfortable saddle that is less likely to present point loading issues. Additionally, even if the lattice structure were visible in FIG. 2 (e.g., if the top surface were transparent), the perimeters of the various stiffness regions may not be apparent from looking at the lattice structure. This is because the varying stiffness may be set by small changes in lattice strut diameter in the different regions.

To account for the more gradual transition in stiffness between the various zones, FIG. 2 further illustrates transition zones 131, 133, and 135. The stiffness of each of the regions A, B, and C is defined as the average stiffness of each region determined using a durometer oriented normal to the surface of the saddle, with readings taken at equally spaced intervals, but excluding any measurements taken within the transition zones 131, 133, 135. The size and shape of the transition zones may be defined as, for example, an area created by offsetting the perimeters 122, 124, 126 by a specific amount in a direction perpendicular to a tangent of the perimeter. For example, the offset may be 5 mm. As another example, the offset may be one, two, three, four, six, seven, eight, nine, or 10 mm. In some embodiments, such as an embodiment that has sharp transitions in stiffness, the offset may be 0 mm, essentially meaning there are no transition zones. When using the designated offset, such as a 5 mm offset, the offset from region A's perimeter 122 would be only inwardly, while the offset from region B's and C's perimeters 124, 126 would be both inwardly and outwardly. Accordingly, a width of transition zone 131 would be 5 mm, while a width of transition zones 133 and 135 would be 10 mm. In some embodiments, the widths of the various transition zones are different from one another. For example, region A's outer perimeter may not have a transition zone (i.e. a width of 0), the transition zone 133 between regions A and B may be a first width, and the transition zone 135 between regions B and C may be a second width that is smaller than the first width. Other configurations are also possible.

In embodiments having a cushion that is a composite structure that forms the various stiffness regions using discrete separate pieces of resilient material, the perimeters of the various stiffness regions can be defined by the physical perimeters of the discrete separate pieces of resilient material. In embodiments having a cushion that does not comprise such discrete physical perimeters, such as the cushion 102 that comprises a lattice structure designed to exhibit different stiffnesses in different regions, the perimeters of the various stiffness regions can be defined differently.

For example, the perimeters may be determined by testing the stiffness of the cushion with a durometer at regularly spaced intervals across the surface of the cushion (such as at 10 millimeter intervals). Areas that exhibit stiffness values that are within 10% of one another may be considered stiffness regions, with transition zones being located between such regions. For a perimeter located between stiffness zones (e.g., perimeters 124 and 126), the perimeter may be defined as a line positioned at a center of the transition zone (e.g., positioned such that distances from the perimeter to the edge of the transition zone on either side of the perimeter, measured perpendicular to a line tangent to the perimeter, are equal). For a perimeter not located between two stiffness zones, the perimeter may be defined differently, such as by following a physical border that defines a boundary of a stiffness zone. For example, perimeter 122 of region A in FIG. 2 is not located between two stiffness zones. Perimeter 122 can comprise or be defined by the following line segments: line 119 (which separates the rear portion 120 from the nose portion 118 of the cushion), a line that follows the outer physical perimeter of the cushion, and a line that follows the junction between the top surface of the cushion and the recessed areas 114, 116. In embodiments similar to the embodiment of FIG. 2, but not including recessed regions 114, 116, the last line segment may be defined by the x-axis.

One example measurement technique to measure the stiffnesses of the various regions is to use a durometer having a spherical 0.200 inch (0.508 centimeter) diameter tip (such as a durometer commercially available as an ASKER® Durometer Type C), and to take measurements at uniformly spaced locations that are spaced 10 mm apart. Alternative techniques may use uniformly spaced locations that are spaced a different distance apart, such as 5 mm or 15 mm. Further, alternative techniques may use a different type of durometer.

In other examples, the perimeters may be determined by evaluating the material(s) and/or physical structure(s) (e.g., lattice structure(s)) of the cushion. For example, a portion of the cushion having the same material(s) and/or physical structure(s) (e.g., lattice structure(s)) of a test specimen of known material(s) and/or physical structure(s) (e.g., lattice structure(s)) and known stiffness can be defined as a particular region of the cushion. In these embodiments, test specimens (e.g., pucks) can be generated by producing specimens of one or more materials with one or more physical structure(s) (e.g., lattice structure(s)) using a same manufacturing method as would be used for the cushion. Stiffnesses of the test specimens can be determined in any suitable manner, such as, for example, using a mechanical stiffness testing machine such as a load frame. MTS Systems Corporation of Eden Prairie, Minn. provides an exemplary load frame that can be used to test stiffness of the test specimens. Accordingly, the perimeters can be identified where changes in the material(s) and/or physical structure(s) (e.g., lattice structure(s)) of the cushion occur.

With respect to the level of stiffness in each region, region B can comprise a stiffness that is greater than 50% and at most 75% of the stiffness of region A. Further, region C can comprise a stiffness that is less than or equal to 50% of the stiffness of region A. In some embodiments, the stiffness of region A can be within a range of 50-70 Asker C hardness.

In some embodiments, the stiffnesses of regions A, B, and C can be 60, 40, and 30 Asker C hardness, respectively. In some embodiments, the stiffnesses of regions A, B, and C can be within the ranges of 57-63, 38-42, and 28.5-31.5 Asker C hardness, respectively. In some embodiments, the stiffnesses of regions A, B, and C can be within the ranges of 54-66, 36-44, and 27-33 Asker C hardness, respectively.

The stiffness regions may take a variety of shapes. In the embodiment of FIG. 2, regions B and C are both generally a teardrop shape. For example, regions B and C both can be shaped such that they have a largest dimension (i.e., a maximum length) and a largest dimension perpendicular to the maximum length (i.e., a maximum width), with the maximum length being greater than the maximum width, and such that widths (e.g., dimensions measured parallel to the maximum width) of regions B and C taper from a larger value to a smaller value from a rearward portion of the region to a forward portion of the region. Such a shape can be desirable, because it can generally conform well to the rider's sit bones. In other embodiments, the regions may be different shapes. For example, one or more of the regions may comprise a teardrop shape a circle, a rectangle, and/or the like. Further, the size ratios of the shapes may be different. For example, the present teardrop shapes of regions B and C may be longer and narrower, shorter and wider, oriented at a different angle, and/or the like.

The stiffness regions may also be a variety of sizes. For example, the surface area of region B (defined as the surface area surrounded by region B's perimeter 124, less the surface area surrounded by region C's perimeter 126), may be within a range of 1,000 $mm^2$ to 10,000 $mm^2$ in some embodiments, or within a range of 5,000 $mm^2$ to 15,000 $mm^2$ in some embodiments. The surface area of region C (defined as the surface area surrounded by region C's perimeter 126) may be within a range of 25% to 75% of the surface area of Region B in some embodiments. In some embodiments, the surface area of region C may be within a range of 750 $mm^2$ to 1,750 $mm^2$. In some embodiments, the surface areas of regions A, B, and C can be within the ranges of 4,000-6,000 $mm^2$, 2,250-2,750 $mm^2$, and 1,000-1,500 $mm^2$, respectively.

In some embodiments, the surface areas of regions A, B, and C can be 6723, 2428, and 1214 $mm^2$, respectively. In some embodiments, the surface areas of regions A, B, and C can be within the ranges of 6386-7060, 2306-2550, and 1153-1275 $mm^2$, respectively. In some embodiments, the surface areas of regions A, B, and C can be within the ranges of 6050-7060, 2306-2550, and 1153-1275 $mm^2$, respectively.

Relative size differences of the different stiffness regions may also be considered based on relative widths of the different stiffness regions. For example, an effective width of a stiffness region is defined for the purposes of this specification as the length of the longest straight line that starts at a point on the stiffness region's perimeter, extends into the stiffness region, and ends when the straight line first intersects another point on the stiffness region's perimeter or a point on another stiffness region's perimeter. In some embodiments, the effective width of region C can be within a range of 40%-70% of the effective width of region B. In some embodiments, the effective width of region C can be within a range of 20%-50% of the effective width of region B. In some embodiments, the effective width of region C can be less than the effective width of region B. In some embodiments, the effective width of region B can be within a range of 20%-50% of the effective width of region A. In some embodiments, the effective width of region B can be within a range of 10%-40% of the effective width of region A. In some embodiments, the effective width of region B can be less than the effective width of region A.

As discussed above, the stiffness regions can be positioned such that a point load will not be placed on the rider's sit bones. FIG. 2 illustrates one positioning of regions B and C that has been found to accomplish this. Other positionings may be utilized, however. In some embodiments, the centroid $B_C$ of region B is located in the longitudinal direction between the y-axis and line 119. The centroid $B_C$ can be located in the lateral direction between lines 142 and 144. Line 142 is a line that is parallel to the longitudinal plane 111 and positioned away from the x-axis by a distance equal to 15% of W/2. Line 144 is a line that is parallel to the longitudinal plane 111 and positioned away from the x-axis by a distance equal to 70% of W/2. W/2 is half of dimension W, which is the dimension across the widest portion of the saddle.

In some embodiments, the centroid $C_C$ of region C is located in the longitudinal direction between the y-axis and line 146. Line 146 is a line that is positioned parallel to the y-axis and positioned away from the y-axis by a distance equal to 45% of $L_1/2$. In some embodiments, line 146 is positioned 80 mm away from the y-axis. $L_1$ is the portion of dimension L (the overall longitudinal length of the saddle 100) that is measured from the y-axis to the forward-most point of the saddle. The centroid $C_C$ can be located in the lateral direction between lines 140 and 144. Line 140 is a line oriented parallel to the longitudinal plane 111 and spaced away from the x-axis by 10% of W/2.

In some embodiments, the length of the saddle L can be about 240 mm, and the width of the saddle W can be about 143 mm or 155 mm. Other embodiments may comprise a length L within a range of about 260-290 mm, or within a range of about 220-250 mm. Further, various embodiments may comprise a width W within a range of about 125-170 mm.

In some embodiments, regardless of the positions of the centroids $B_C$ and $C_C$, region C will still remain enclosed by region B. Accordingly, as an example, if the centroid $B_C$ for region B were moved significantly laterally outward, other parameters, such as the respective region sizes and/or the location of centroid $C_C$ may be changed to keep region C enclosed within region B.

In some embodiments, the positions of the centroids $B_C$ and $C_C$ can be (17, 30) and (17, 30), respectively, with the coordinates given as (x, y) coordinates in millimeters, with the origin being the position in FIG. 2 where the x- and y-axes cross. In some embodiments, the positions of the centroids $B_C$ and $C_C$ can be within the ranges of (16.15-17.85, 28.5-31.5) and (16.15-17.85, 28.5-31.5), respectively. In some embodiments, the positions of the centroids $B_C$ and $C_C$ can be within the ranges of (15.3-18.7, 27-33) and (15.3-18.7, 27-33), respectively. In some embodiments, both centroids $B_C$ and $C_C$ are positioned longitudinally away from the y-axis by at least 15 mm and no more than 35 mm in the positive-x direction. In some embodiments, Region A comprises a centroid with a position of (10, 40). In some embodiments, the position of Region A's centroid is within a range of (9.5-10.5, 38-42). In some embodiments, the position of Region A's centroid is within a range of (9-11, 36-44).

Bicycle

Figure 5:
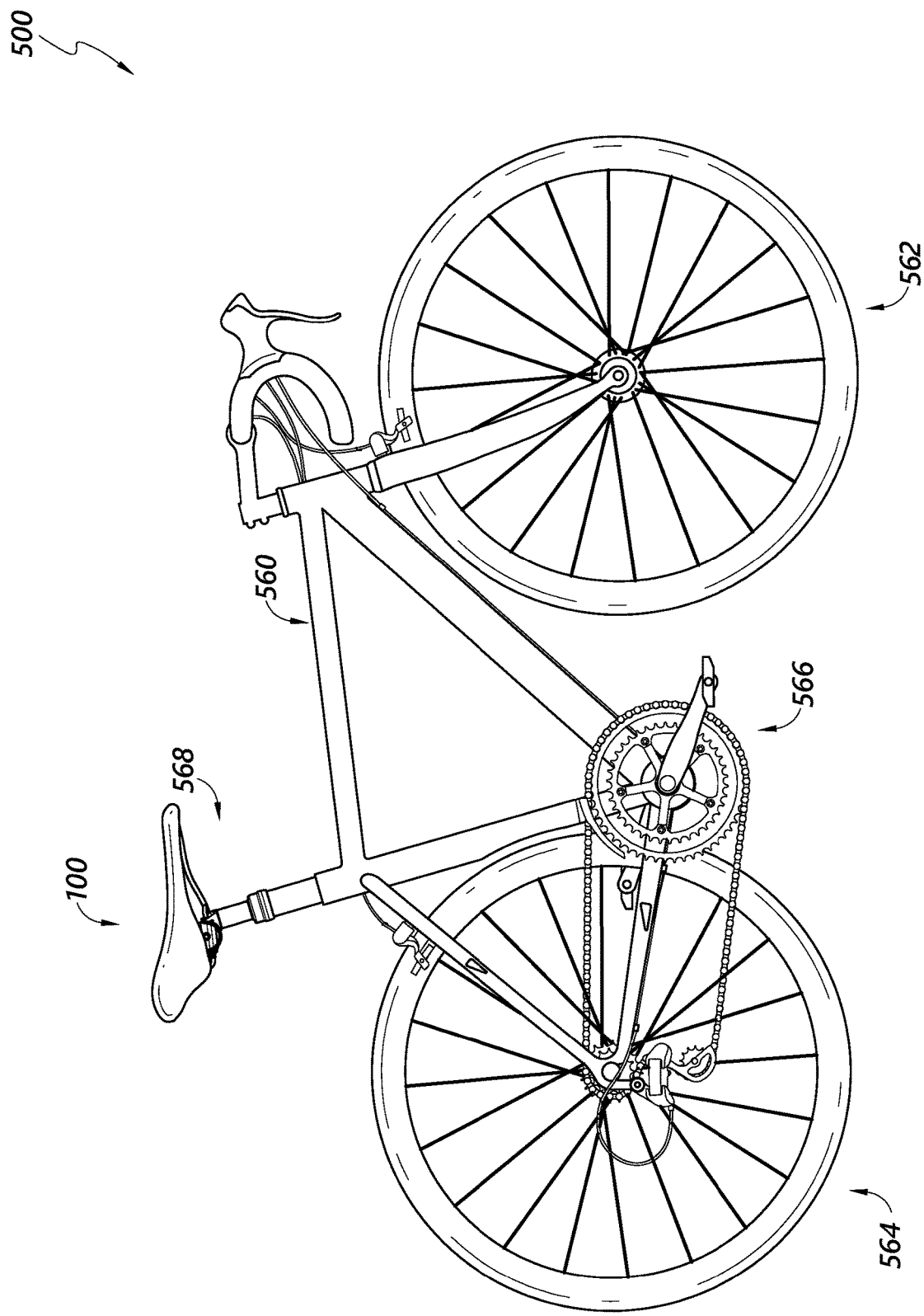
FIG. 5 illustrates a side view of one embodiment of a bicycle.

FIG. 5 illustrates an example of the saddle 100 of FIG. 2 in use with a full bicycle 500. The bicycle 500 comprises a frame 560 having rotatably coupled thereto a front wheel 562 and a rear wheel 564. The bicycle 500 further comprises a pedal crank assembly 566 configured to enable a rider to power the rear wheel 564. The saddle 100 is coupled to the bicycle 500 at an upper end of a saddle post 568 (e.g., a saddle receiver). Other bicycle frames may also be used with the saddle 100.

3D Printing Technology

As discussed above, the cushion 102 shown in FIG. 1 may be produced using 3-D printing technology. 3-D printing is a form of additive manufacturing that generally forms a product one layer at a time. For example, in some 3-D printing technologies, a polymer filament is heated and extruded through an extruder. The extruder and/or the work surface are moved along the x- and y-axes to extrude a single layer of the product. After one layer is extruded, the extruder and/or the work surface are moved with respect to one another along the z-axis by a small increment. The next layer is then added, and the process repeats until a finished product is produced. Such a process could be used to form the cushion 102.

As another example, in some 3-D printing technologies, a bath of resin is provided, and portions of that resin bath are solidified layer by layer, using light projection, until the final shape of the finished product is produced. One such commercially available technology is DIGITAL LIGHT SYNTHESIS' technology provided by CARBON®. More details about this technology can be found in an article titled CARBON LATTICE INNOVATION—THE ADIDAS® STORY, located at https://www.carbon3d.com/white-papers/carbon-lattice-innovation-the-adidas-story/, the entirety of which is incorporated by reference herein. The CARBON LATTICE INNOVATION article describes how the DIGITAL LIGHT SYNTHESIS' technology was used to print a shoe midsole that has varying cushioning properties based on variations in the lattice structure. Similar technology can be applied to the present saddle designs, to produce a saddle having varying stiffness regions based on variations in the lattice structure.

Various figures provided herewith of the cushion 102 illustrate some of the lattice structure in this cushion. For example, with reference to FIG. 1, a lattice structure can be seen within the recessed regions 114, 116. Further, the views of FIGS. 4A-4D illustrate some of the lattice structure of the cushion 102. As discussed above, the specific structure of the lattice structure (e.g., strut sizes and spacing, opening sizing and spacing, and/or the like) can be computer-generated by software that generates such a structure based on a defined set of input parameters, such as the desired stiffnesses in various regions.

When the cushion 102 is 3-D printed, the cushion can comprise a blend of UV curable resin and elastomeric polyurethane. Other materials may be used, however, provided they are capable of meeting the stiffness requirements disclosed herein.

The concepts disclosed herein are not limited to the 3-D printed lattice structures produced by CARBON®, however. For example, other 3-D printed processes may be used, or non-3-D printed processes may be used. Further, as discussed above, the varying stiffness regions of saddles disclosed herein may be generated through use of a composite cushion formed of more than one rubber or foam each having different stiffness properties.

ADDITIONAL DESCRIPTION

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A bicycle saddle comprising:
a base structure comprising a top portion; and
a cushion coupled to the top portion of the base structure, the cushion comprising a nose portion, a rear portion, and a longitudinal plane positioned at a lateral midpoint of a widest point of the cushion, the longitudinal plane extending from a rear of the rear portion to a front of the nose portion,
wherein the cushion further comprises a first lateral side and a second lateral side separated by the longitudinal plane, wherein each of the first lateral side and the second lateral side comprises:
a first region comprising deformable three-dimensional lattice structures that define a first stiffness; and
a second region comprising deformable three-dimensional lattice structures that define a second stiffness, wherein the second stiffness is no greater than 75% of the first stiffness,
wherein the first region and the second region of each of the first lateral side and the second lateral side are configured such that, when considered as projections onto a lateral plane:
a perimeter of the first region defines a first surface area, and
a perimeter of the second region defines a second surface area that is less than the first surface area and that is at least 1,000 mm$^2$,
wherein the lateral plane is perpendicular to the longitudinal plane, and the lateral plane is oriented such that one of:
the lateral plane is coincident with a highest point of the nose portion of the cushion and a highest point of the rear portion of the cushion, or
the lateral plane is parallel to two rail axes, each of the two rail axes being defined by a mounting portion of a rail that supports the top portion of the base structure.

2. The bicycle saddle of claim 1, wherein the second stiffness is at least 50% of the first stiffness.

3. The bicycle saddle of claim 1, wherein a forward-most extent of the perimeter of the first region is defined by a line that is perpendicular to the longitudinal plane and positioned halfway between a forward-most point of the nose portion of the cushion and the widest point of the cushion.

4. The bicycle saddle of claim 1, wherein a centroid of the second region is positioned longitudinally rearward of a centroid of the first region.

5. The bicycle saddle of claim 1, wherein each of the first stiffness and the second stiffness is defined as an average stiffness as measured normal to the lateral plane at uniformly spaced locations across a corresponding region of the first region and the second region, using a durometer having a 0.508 centimeter spherical diameter indenter.

6. The bicycle saddle of claim 5, wherein adjacent uniformly spaced locations of the uniformly spaced locations are located 10 millimeters apart from each other.

7. The bicycle saddle of claim 1, wherein the second surface area is no greater than 2,750 mm$^2$.

8. The bicycle saddle of claim 1, wherein each of the first lateral side and the second lateral side further comprises a third region comprising deformable three-dimensional lattice structures that define a third stiffness, wherein the third stiffness is less than the second stiffness.

9. The bicycle saddle of claim 8, wherein the third region of each of the first lateral side and the second lateral side is configured such that, when considered as a projection onto the lateral plane, a perimeter of the third region defines a third surface area that is less than the second surface area.

* * * * *